United States Patent
Ashley et al.

(10) Patent No.: US 9,703,986 B1
(45) Date of Patent: Jul. 11, 2017

(54) DECENTRALIZED REPUTATION SERVICE FOR SYNTHETIC IDENTITIES

(71) Applicant: Anonyome Labs, Inc., Draper, UT (US)

(72) Inventors: Paul Ashley, Queensland (AU); Steve Shillingford, Draper, UT (US); Greg Clark, San Francisco, CA (US); Dennis Wilkins, Salt Lake City, UT (US); Mike Neuenschwander, Lehi, UT (US); Stephen Sartor, Queensland (AU)

(73) Assignee: Anonyome Labs, Inc., Draper, UT (US)

( * ) Notice: Subject to any disclaimer, the term of this patent is extended or adjusted under 35 U.S.C. 154(b) by 32 days.

(21) Appl. No.: 14/826,028

(22) Filed: Aug. 13, 2015

Related U.S. Application Data

(60) Provisional application No. 62/161,158, filed on May 13, 2015.

(51) Int. Cl.
| | | |
|---|---|---|
| G06F 21/62 | (2013.01) | |
| H04L 29/06 | (2006.01) | |
| G06F 17/30 | (2006.01) | |
| G06F 21/55 | (2013.01) | |

(52) U.S. Cl.
CPC .... *G06F 21/6263* (2013.01); *G06F 17/30864* (2013.01); *G06F 21/552* (2013.01); *H04L 63/20* (2013.01)

(58) Field of Classification Search
CPC .......................... G06F 21/552; G06F 21/6263
See application file for complete search history.

(56) References Cited

U.S. PATENT DOCUMENTS

| | | | | |
|---|---|---|---|---|
| 6,898,709 B1 * | 5/2005 | Teppler | ................ | H04L 9/3263 713/178 |
| 8,484,132 B1 * | 7/2013 | Christiansen | .......... | G06Q 40/00 705/35 |
| 8,914,645 B2 * | 12/2014 | Duncan | ................... | G06F 21/32 713/186 |
| 9,210,156 B1 * | 12/2015 | Little | ...................... | H04L 63/08 |
| 2013/0333048 A1 * | 12/2013 | Coggeshall | ............. | H04L 63/12 726/26 |
| 2014/0283094 A1 * | 9/2014 | Coggeshall | ............. | G06F 21/50 726/26 |
| 2014/0289833 A1 * | 9/2014 | Briceno | .................. | H04L 63/08 726/7 |
| 2015/0205957 A1 * | 7/2015 | Turgeman | ............. | G06F 21/554 726/23 |

\* cited by examiner

*Primary Examiner* — Dao Ho
(74) *Attorney, Agent, or Firm* — Cooley LLP

(57) ABSTRACT

A machine has a processor and a memory connected to the processor. The memory stores instructions executed by the processor to collect synthetic identity activity information characterizing computer network activity associated with a synthetic identity. A synthetic identity reputation score is computed based upon a current synthetic identity reputation score, a synthetic identity activity value and an activity provider weighting.

6 Claims, 10 Drawing Sheets

Using a Personal Privacy Proxy to Protect a User's Primary Identity

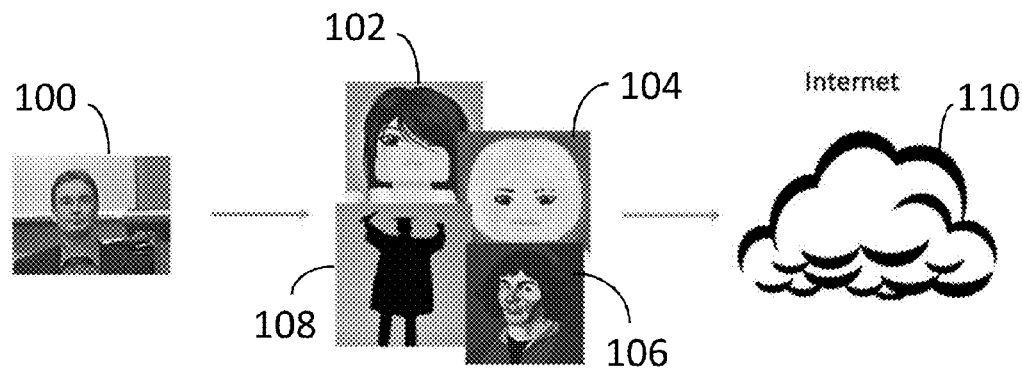
Figure 1: Using a Personal Privacy Proxy to Protect a User's Primary Identity
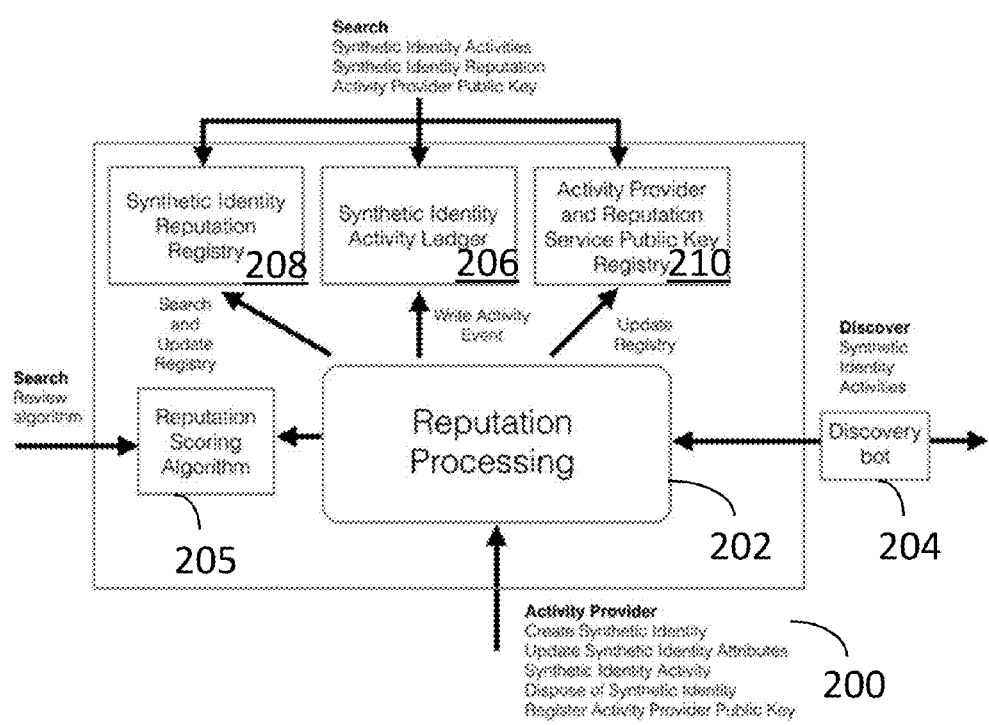
Figure 2: Overview of the Decentralised Synthetic Identity Reputation Service

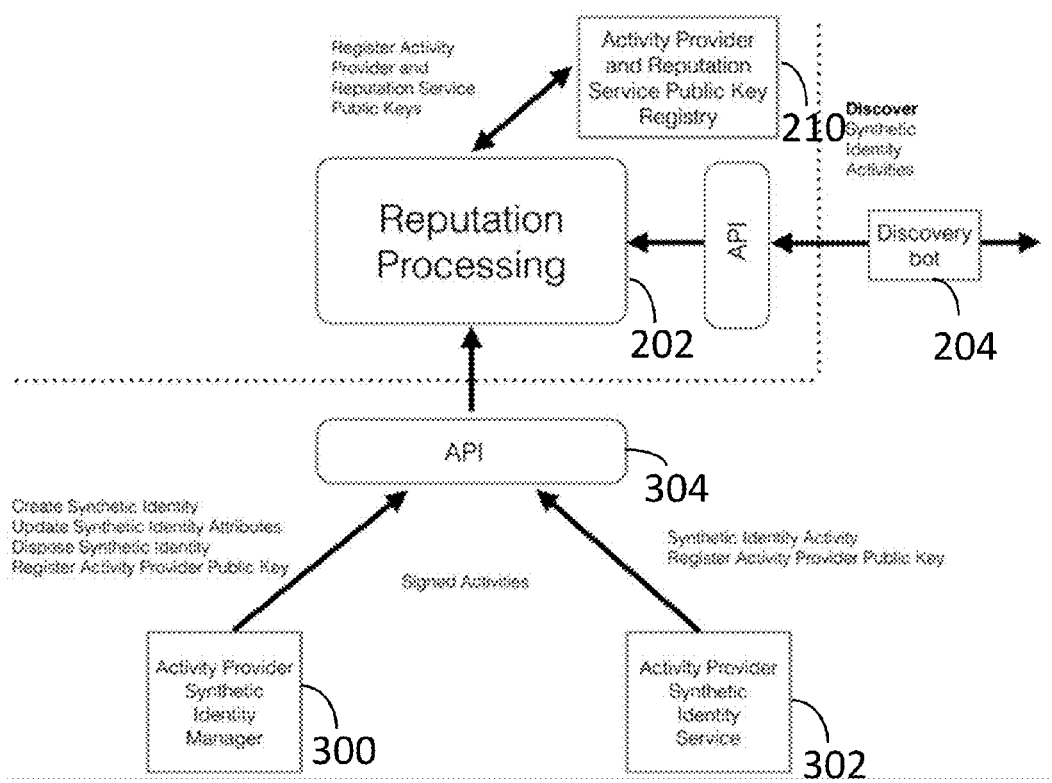
Figure 3: Receiving Activities from Activity Providers
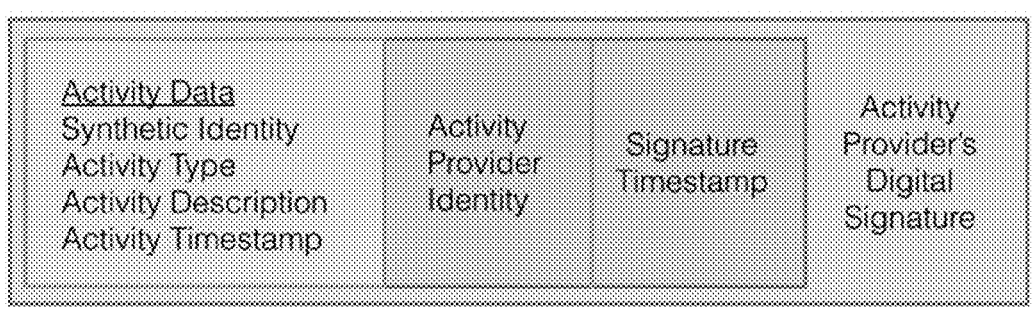
Figure 4: Digitally Signed Activity Data

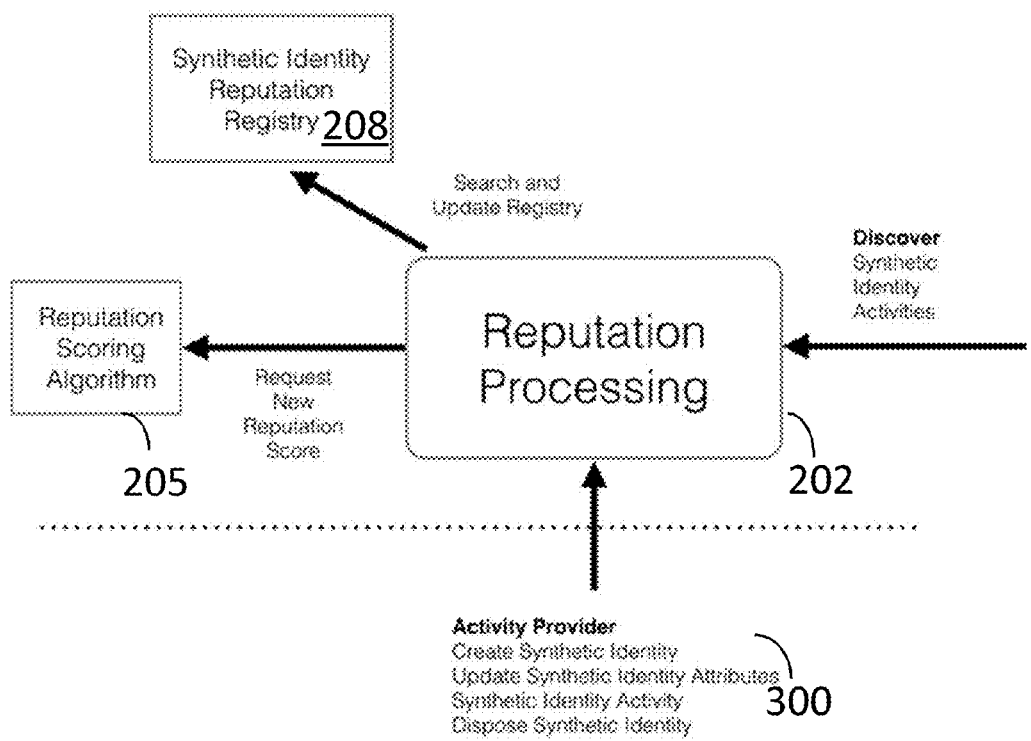
Figure 5: Calculating Reputation Score Based on Activity

| Activity Type | Activity Value |
|---|---:|
| 1 year of persona life | 5 |
| Hire car | 10 |
| Taxi trip | 5 |
| Email in | 3 |
| Voice call in | 1 |
| Voice call out | 3 |
| Message in | 3 |
| Create Social Account | 5 |
| Posting on social account | 1 |
| Obtaining Credit Card | 10 |
| Purchasing online | 4 |
| Poor hotel rental experience | -5 |
| Inappropriate blogging | -10 |
| Poor ride sharing experience | -7 |
| Poor selling experience | -6 |

FIG. 6

| Activity Provider | Activity Provider Weighting |
|---|---:|
| Reputation Service | 1.0 |
| Major car rental company | 1.5 |
| Minor car rental company | 0.5 |
| Major credit institution | 1.7 |
| Major social media site | 1.2 |
| Minor blog site | 0.3 |
| Major accommodation sharing app | 1.3 |
| Minor accommodation sharing app | 0.6 |

FIG. 7

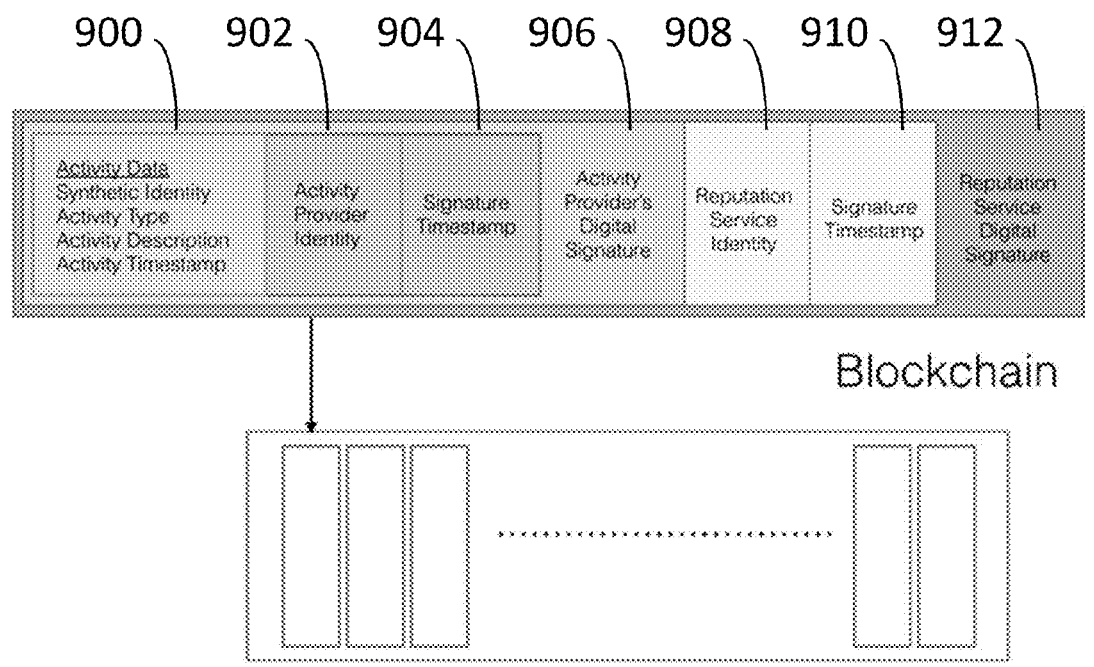
Figure 8: Formula for Calculating Reputation
Figure 9: Using the Blockchain as a Ledger of Synthetic Identity Activities

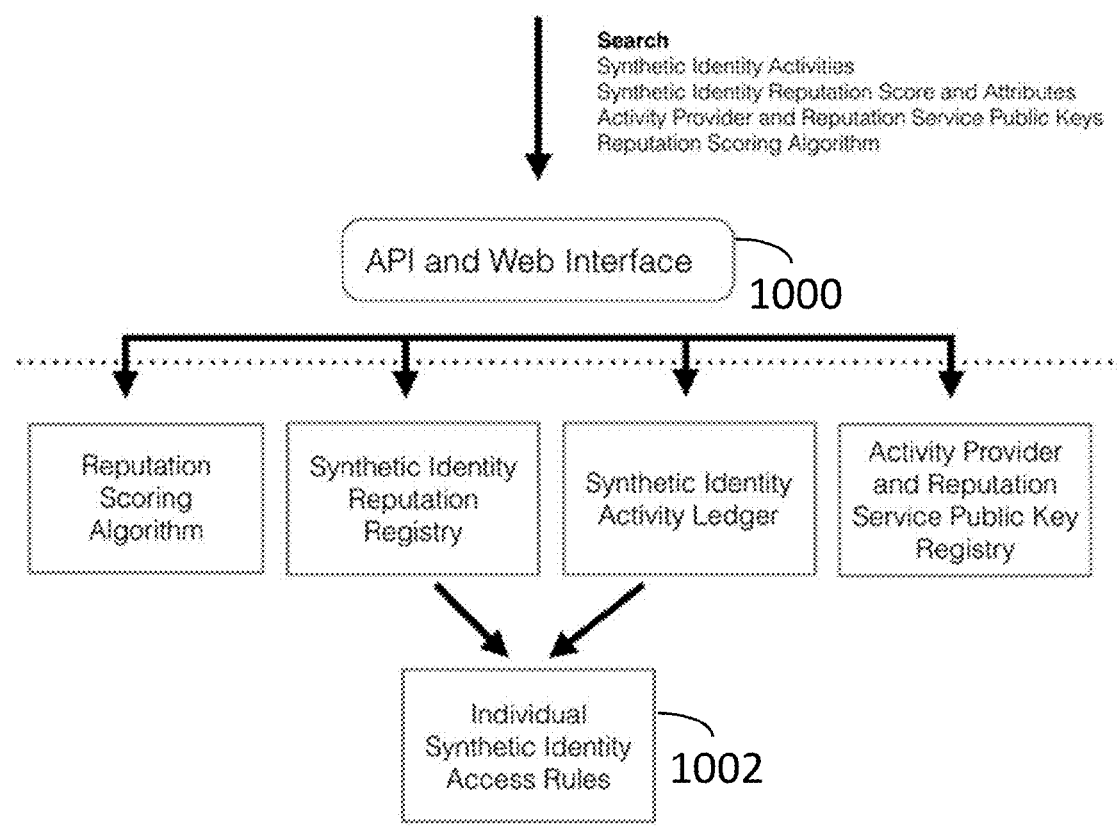
Figure 10: External Access Synthetic Identity Reputation Data

Figure 11: Extending to Multiple Reputation Services

```
CREATE A SYNTHETIC IDENTITY

POST /identities
Data:
{
    name: (string)
}
Response:
{
    id: (id),
    name: (string)
}
```

```
UPDATE SYNTHETIC IDENTITY ATTRIBUTES

PATCH /identities/[sid]
Data:
{
    name: (string)
}
```

FIG. 13

```
DELETE SYNTHETIC IDENTITY

DELETE /identities/[sid]

Response:
HEAD 200 (OK)
```

FIG. 14

```
CREATE A REPUTATION PROVIDER

POST /reputation_providers
Data:
{
    name: (String)
    public_key: (binary key)
}
Response:
{
    id: (id),
    name: (String),
    public_key: (binary key)
}
```

FIG. 15

```
UPDATE REPUTATION PROVIDER

PATCH /reputation_providers/[provider id]
Headers:
{
    Authorization: (signature)
}
Data:
{
    name: (string),
    public_key: (binary key) // if update needed
}
```

FIG. 16

```
CREATE A REPUTATION ACTIVITY

POST /reputation_providers/[provider id]/activities
Headers:
{
    Authorization: (signature)
}
Data:
{
    name: (String),
    description: (String),
    activity_type: (integer for available types)
}
Response:
{
    id: (id),
    name: (String),
    description: (String),
    activity_type: (integer for available types),
    score: (number)
}
```

FIG. 17

```
RECORD AN ACTIVITY EVENT TO SYNTHETIC IDENTITY'S
REPUTATION LEDGER.

sid = Synthetic Identity's Globally Unique Identifier

POST /identities/[sid]/reputation
Data:
{
    activity_id: (id),
    activity_timestamp: (Timestamp),
    provider_id: (id),
    signature: (String)
}

Response:
HEAD 200 (OK)
```

FIG. 18

DECENTRALIZED REPUTATION SERVICE FOR SYNTHETIC IDENTITIES

CROSS-REFERENCE TO RELATED APPLICATION

This application claims priority to U.S. Provisional Patent Application Ser. No. 62/161,158, filed May 13, 2015, the contents of which are incorporated herein by reference.

FIELD OF THE INVENTION

This invention relates generally to electronic communications in computer networks. More particularly, this invention relates to a decentralized reputation service for synthetic identities used in electronic communications in computer networks.

BACKGROUND OF THE INVENTION

With the current state of identity theft, uncontrolled data collection and targeted marketing, there is a need for a user to protect a primary identity and to compartmentalize online activity. For example, the user might prefer to use a primary identity for general browsing or reading online newspapers, while another identity is used for accessing and commenting on social media, while another identity is used for purchasing from e-commerce applications, and yet another identity is used for selling furniture on an electronic commerce web site.

One method to achieve this separation (or compartmentalization) is to allow a user to create multiple synthetic identities and then use them for different purposes. Each synthetic identity (also known as a persona) has its own identity attributes which may include name, address, date of birth, phone, email, credit and delivery address. Each synthetic identity should be used for a limited and specific purpose, so that tracking of that identity would not form a complete picture of the user's activity.

This is shown in FIG. 1 where a real user 100 has a number of synthetic identities 102, 104, 106 and 108 that are used to protect their primary identity when accessing Internet services 110. The synthetic identities act as a personal privacy proxy, insulating the Internet services access to the user's primary identity.

There does not necessarily need to be a one to one relationship between a primary identity and synthetic identity. It may be more suitable for two people to share a synthetic identity, e.g., in a family situation, or for a synthetic identity to represent a larger group, e.g., sporting team or company.

One difficulty when creating a new synthetic identity is that there is insufficient available evidence to prove it can be trusted. That is, because there is no way to demonstrate a history of legitimate transactions, people and service providers may not be willing to interact with the synthetic identity.

Illustrating the problem, organizations such as eBay® provide a reputation service for buyers and sellers that allow two parties that don't know each other to interact with some confidence. Buyers and sellers can rate each other at the end of a transaction, and these ratings build a reputation score. A positive review will increase the reputation score and a negative review will decrease the reputation score.

The first problem with this approach to reputation is that it is a closed system. The identities and reputation scores are not trusted outside of the closed ecosystem. For example, even if a person has built a strong reputation with one service, that reputation is not transferable to another service. A second problem is that there is no objective measure of how a reputation is obtained as it is based mainly on personal opinion.

Therefore, it would be desirable to have an objective measure and open methodology for creating a reputation. This is true for primary identities, but it is significantly more pronounced for synthetic identities. There is a need for a new decentralized approach to reputation that allows synthetic identities to build a reputation that can be trusted in a variety of situations. Such a system should allow one to search for an identity's reputation with corresponding strong evidence on how it was calculated.

SUMMARY OF THE INVENTION

A machine has a processor and a memory connected to the processor. The memory stores instructions executed by the processor to collect synthetic identity activity information characterizing computer network activity associated with a synthetic identity. A synthetic identity reputation score is computed based upon a current synthetic identity reputation score, a synthetic identity activity value and an activity provider weighting.

BRIEF DESCRIPTION OF THE FIGURES

The invention is more fully appreciated in connection with the following detailed description taken in conjunction with the accompanying drawings, in which:

FIG. 1 illustrates the utilization of synthetic identities in a network environment.

FIG. 2 illustrates a decentralized synthetic identity reputation service configured in accordance with an embodiment of the invention.

FIG. 3 illustrates receiving activity reports from activity providers in accordance with an embodiment of the invention.

FIG. 4 illustrates digitally signed activity data configured in accordance with an embodiment of the invention.

FIG. 5 illustrates the calculation of a reputation score based upon activity reports.

FIG. 6 illustrates exemplary activity types and corresponding activity values.

FIG. 7 illustrates activity providers and corresponding activity provider weights.

FIG. 8 illustrates a reputation calculation computed in accordance with an embodiment of the invention.

FIG. 9 illustrates a synthetic identity block chain used in accordance with an embodiment of the invention.

FIG. 10 illustrates external access to synthetic identity reputation data.

FIG. 11 illustrates distributed reputation services utilized in accordance with an embodiment of the invention.

FIGS. 12-18 illustrate example application program interfaces utilized in accordance with an embodiment of the invention.

Like reference numerals refer to corresponding parts throughout the several views of the drawings.

DETAILED DESCRIPTION OF THE INVENTION

Figure 12:
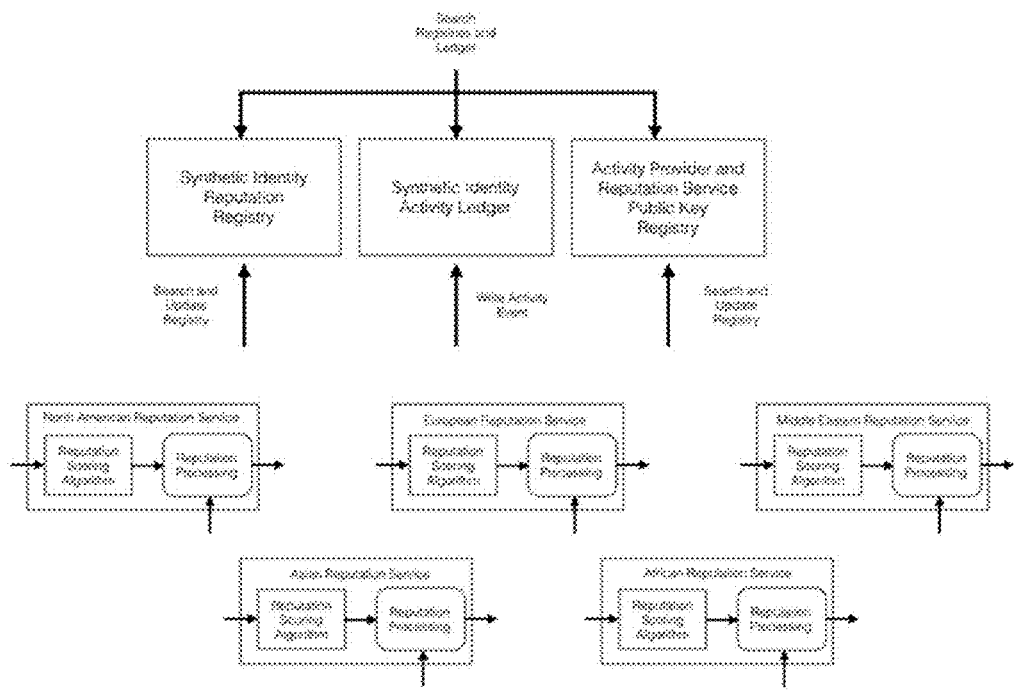

FIG. 2 shows an overview of the decentralized reputation service for synthetic identities. External Activity Providers 200 send activities or activity reports to the reputation service 202 for reputation processing. Example activities include the creation of a synthetic identity, updates to the synthetic identity attributes, synthetic identity activities, and disposing of a synthetic identity.

The reputation service 202 may use a discovery bot 204 to search the Internet for activities of the synthetic identity. In this case, the reputation service 202 operates as an Activity Provider. The reputation service 202 takes these events and applies a reputation scoring algorithm 205 to them. It is important that this algorithm is available for scrutiny, so that it can be tuned to remove any biases and confidence in the algorithm is able to grow. The synthetic identity's reputation score will increase or decrease as new events for the synthetic identity are received. The reputation score may also increase because of a synthetic identity's ongoing existence, i.e., the reputation increases naturally with the age of the synthetic identity.

A Synthetic Identity Activity Ledger 206 is updated to record the events of the synthetic identity. The ledger is immutable which gives confidence that a reputation score can be validated by looking up the events in the ledger related to the synthetic identity. In one embodiment, events are digitally signed by the Activity Provider and the Reputation Service.

A Synthetic Identity Reputation Registry 208 holds the synthetic identity, its attributes and a reputation score. The registry is updated based on specific events, e.g., creation of synthetic identity, change of attributes, reputation score update and disposal of the synthetic identity.

An Activity Provider and Reputation Service Public Key Registry 210 holds Activity Provider and Reputation Service public keys. The public keys can be used to validate activities as they are received from Activity Providers. The public keys may also be used to validate any activities in the Synthetic Identity Activity Ledger.

The system supports various search functions. For example, the Synthetic Identity Reputation Registry 208 may be searched for the reputation score and other attributes of the synthetic identity. In one embodiment, the owner of a synthetic identity has control over how much of this information is available to an external party.

The Synthetic Identity Activity Ledger 206 may be searched for signed synthetic identity activities. This functionality can be used to understand why a synthetic identity has a particular reputation score. In one embodiment, the owner of a synthetic identity has control over how much of this information is available to an external party.

The Activity Provider and Reputation Service Public Key Registry 210 may be searched for public keys. The public keys are used for activity validation.

FIG. 3 shows a more detailed view of how Activity Providers send activities to the Reputation Service 202. A synthetic identity manager 300 manages the lifecycle of a synthetic identity. For example, it creates, updates and disposes of synthetic identities. The system supports many synthetic identity managers.

A synthetic identity service 302 provides service for the synthetic identity. For example, it may be used to hire a car, buy items, sell items, arrange for dates, and the like. The system supports many synthetic identity services providers.

Before the Reputation Service 202 will accept activities, the Activity Provider must be registered. This includes providing a public key that will be stored in the Activity Provider and Reputation Service Public Key Registry 210. One available choice for the registry is an LDAP accessible directory.

The API 304 in FIG. 3 denotes a programmatic interface provided by the Reputation Service for registering the Activity Providers and for receiving activities. The Reputation Service 202 provides a set of web services, e.g., restful web services, listening for the requests. FIGS. 12-18 provide exemplary application program interface functions. FIG. 12 illustrates the creation of a synthetic identity. FIG. 13 illustrates updating synthetic identity attributes. FIG. 14 illustrates deleting a synthetic identity. FIG. 15 illustrates creating a reputation provider. FIG. 16 illustrates updating a reputation provider. FIG. 17 illustrates creating a reputation activity. FIG. 18 illustrates recording an activity to a synthetic identity reputation ledger.

As previously mentioned, the reputation service 202 may operate with a discovery bot 204 to search the Internet for activities associated with the synthetic identity. Example activities include posts to Twitter®, Facebook®, blogs, technical papers and other activities. This is analogous to rating university academics by searching for academic publications and references to these publications. The Discovery Bot 204 searches the Internet for activities and thereby operates as an Activity Provider itself.

The Activity Providers digitally sign activity data, as shown in FIG. 4. FIG. 4 illustrates a field for characterizing activity date, a field for activity provider identity, a signature timestamp field and a field for the activity provider's digital signature. This information allows the activities to be initially validated by the Reputation Processing component, but also validated at later time when stored in the Synthetic Identity Activity Ledger. A strong digital signature algorithm should be employed, e.g., Digital Signature Standard outlined in FIPS 186-4.

Turning to FIG. 5, an activity provider 300 submits activities to the reputation service 202. When activities are received for Reputation Processing, an update is made to the synthetic identity's reputation score based on the activity. In one embodiment, the reputation service 202 accesses the scoring algorithm 205 to obtain a new reputation score. The Reputation Processing component first looks up the synthetic identity's current Reputation Score from the Synthetic Identity Reputation Registry 208. It then asks the Reputation Scoring Algorithm 205 for a new Reputation Score based on the new activity. Finally, it updates a new Reputation Score to the Synthetic Identity Reputation Registry 208. Similar to the public key registry, a suitable choice for implementation may be an LDAP compatible directory.

FIG. 6 shows the first component of the scoring algorithm. Each type of activity of the synthetic identity is allocated an Activity Value. In the table an example set of Activity Types are listed with an associated Activity Value in the range of −10 to 10. Activity types should have a range of values. This allows an Activity Provider to reflect a negative experience when dealing with the user e.g., bullying on a blog, an Airbnb® room left in an unacceptable state.

The second component of the scoring algorithm is the Activity Provider Weighting, as shown in FIG. 7. Some Activity Providers will add more weight or importance to activities that they register than others. For example, an established car rental vendor may assert more weight on the activity, versus a newer car rental vendor. Weight values may change over time.

The third component of the algorithm is a method that controls the growth of the synthetic identity's reputation score. The underlying concept is that the reputation score grows more slowly the higher the score. Mathematically the formula is based on an asymptote $f(x)=1/x$. Writing the formula in a more straightforward way, FIG. 8 outlines how the new reputation score is calculated based on the activity value, activity provider weighting, the current reputation score and a scaling factor.

To explain the algorithm a series of steps showing how the synthetic identity's reputation changes is outlined. In one embodiment, the scaling factor is 10. This is a result of the activity value having a range of −10 to 10. Consider the following example, a synthetic identity always starts with an initial Reputation Score of 1. Therefore, upon the initial creation of a synthetic identity the reputations core is 1. The synthetic identity then applies for a credit card. The following reputation score is then computed: 1+10*1.7/1*10=2.7

The synthetic identity then rents a hire car from a minor rental car company, resulting in the following computation: 2.7+10*0.5/2.7*10=2.88. The synthetic identity then creates a social account on a major site, resulting in the following computation: 2.88+5*1.2/2.88*10=3.09. The synthetic then posts an inappropriate message on major social site, resulting in the following computation: 3.09+(−10)*1.2/3.09*10=2.70.

The examples are used to illustrate the algorithm. The activity values, activity provider weighting and scaling factor can be expected to be tuned over time so that the reputation score is an accurate measure of the trustworthiness of the synthetic identity. This is the purpose of allowing full disclosure of the algorithm. Through public scrutiny and analysis it can be improved. Note also that because of the negative view from the social site of a synthetic identity's behavior their Reputation Score decreased.

FIG. 9 shows the design of one embodiment of the Ledger. Blockchain technology is utilized to provide an immutable record of the synthetic identity's activities. A blockchain is a transaction database shared by all nodes participating in a system. A full copy of a block chain contains every transaction ever executed. For example, with this information, one can find out a synthetic identity's reputation score at any point in history. Every block contains a hash of the previous block. This has the effect of creating a chain of blocks from the genesis block to the current block. Each block is guaranteed to come after the previous block chronologically because the previous block's hash would otherwise not be known. Each block is also computationally impractical to modify once it has been in the chain for a while because every block after it would also have to be regenerated. This makes committing fraud in the system more difficult.

In FIG. 9 the activity data 900 includes the Synthetic Identity, Activity Type, Activity Description and Activity Timestamp. The Activity Provider appends to this the Activity Provider Identity 902, Signature Timestamp 904 and a Digital Signature 906 calculated across all of the data.

This signed data is submitted to the Reputation Service. Once received the Reputation Service adds the Reputation Service Identity 908, Signature Timestamp 910 and a new Digital Signature 912 calculated across all of the data. The completed record is added to the Blockchain.

Thus, the ledger allows an external party to confirm the calculations of the Reputation Service for any synthetic identity. The party simply walks the blockchain finding activities of the synthetic identity and verifying the score. Because of the immutable nature of the blockchain they are able to identify any fraud. The ledger also allows an external Reputation Service to use the activities of the synthetic identity to calculate their own score. This is analogous to two different credit rating agencies using the same data but different methods to come up with different credit results.

In a fully distributed blockchain based system there needs to be mechanisms in place to prevent fraud. In the case of the reputation ledger outlined above, fraud is prevented by allowing only registered Reputation Services to update the blockchain. An additional use of the reputation service blockchain is to store synthetic identity attribute information, i.e., through the lifespan of a synthetic identity. A synthetic identity might have some identity attributes that are constant and others that vary over time, e.g., phone number and the blockchain can be an immutable record of those changes. Therefore the full lifespan of both activities and identity attributes can be retrieved from the blockchain.

External Reputation Services and Activity Providers may want to access a range of reputation related data. Some examples are synthetic identity reputation score and synthetic identity attributes, synthetic identity activities in the ledger to confirm the reputation score, details of the algorithm for calculating the score and Activity Provider and Reputation Service public keys.

FIG. 10 illustrates an API and web interface 1000 that exposes web services, such as, restful web services, for accessing data. Additionally a web interface allows a human to perform searches and retrieve the appropriate data. FIGS. 19 and 20 show detailed definitions of the API.

FIG. 10 illustrates synthetic identity access rules 1002 to control access to reputation data. The synthetic identity is able to specify which of its reputation data is available. For example, only the synthetic identity's reputation score may be made accessible, the synthetic identity's reputation score as well as a whitelisted set of Activity Provider activities may be made accessible, and/or the synthetic identity's reputation score and all Activity Provider activities may be made available.

The invention may be implemented with multiple reputation services that access the activity ledger. FIG. 11 illustrates such a system. In this case there are multiple Reputation Services, each serving a particular geographical region. The Activity Providers communicate with the Reputation Service in the same geographic region. In this case, the term "Reputation Service" is slightly redefined to include only the receiving of activities and calculation of a reputation score. Each of the Reputation Services communicates with the central registries and ledger.

It may be the case that each of the Reputation Services uses the same algorithm for computing the score, or they might in fact use different algorithms. The overall Reputation Score may be some weighted average of the reputation scores across the Reputation Services.

Another use of the Reputation System is as an input or starting point for a closed reputation system. For example, suppose a synthetic identity has a Reputation Score of 6.2 within the decentralized system. This score could also be used as input when calculating an initial score on a closed reputation system, such as eBay®.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
  a processor; and
  a memory connected to the processor, the memory storing instructions executed by the processor to:
    collect synthetic identity activity information characterizing computer network activity associated with a synthetic identity, wherein the synthetic identity is associated with a real user used and is used to protect the primary identity of the real user, and wherein instructions executed by the processor to collect include instructions to search the Internet for activities of the synthetic identity, and
    compute a synthetic identity reputation score based upon a current synthetic identity reputation score, a synthetic identity activity value and an activity provider weighting, wherein instructions executed by the processor to compute a synthetic identity reputation score produces a synthetic identity reputation score that grows more slowly the higher the score,
    wherein the synthetic identity activity information is maintained in a ledger of digitally signed activity data, and
    wherein the ledger includes a block chain comprising activity data, activity provider identity, activity provider signature timestamp, activity provider digital signature, reputation service identity, reputation service signature timestamp and reputation service digital signature.

2. The machine of claim 1 wherein the synthetic identity activity information is collected through an application program interface from a plurality of activity providers.

3. The machine of claim 1 wherein the synthetic identity activity information is collected through a discovery bot.

4. The machine of claim 1 further comprising instructions executed by the processor to apply individual synthetic identity access rules.

5. The machine of claim 1 further comprising instructions executed by the processor to supply access to a reputation scoring algorithm.

6. The machine of claim 1 further comprising instructions executed by the processor to maintain an activity provider and reputation service public key registry.

* * * * *